United States Patent [19]
Inaba
[11] Patent Number: 4,658,324
[45] Date of Patent: Apr. 14, 1987

[54] SURGE ABSORBING DEVICE

[75] Inventor: Toshikazu Inaba, Gyoda, Japan
[73] Assignee: Okaya Electric Industries Co., Ltd., Tokyo, Japan

[21] Appl. No.: 750,330
[22] Filed: Jun. 28, 1985

Related U.S. Application Data

[63] Continuation-in-part of Ser. No. 592,806, Mar. 23, 1984, abandoned.

[30] Foreign Application Priority Data

| | | | |
|---|---|---|---|
| Mar. 23, 1983 | [JP] | Japan | 58-41462 |
| Jun. 17, 1983 | [JP] | Japan | 58-92827 |
| Jan. 20, 1984 | [JP] | Japan | 59-6754 |

[51] Int. Cl.[4] ........ H02H 9/04
[52] U.S. Cl. ........ 361/118; 361/111
[58] Field of Search ........ 361/58, 111, 117, 118, 361/119, 126, 127

[56] References Cited

U.S. PATENT DOCUMENTS

| | | | |
|---|---|---|---|
| 3,876,894 | 4/1975 | Peche | 361/118 X |
| 3,889,222 | 6/1975 | Takano et al. | 361/118 X |
| 3,961,225 | 6/1976 | Tachibana et al. | 361/118 |
| 4,233,641 | 11/1980 | Baumbach | 361/127 X |
| 4,237,515 | 12/1980 | Pierce, Jr. | 361/127 |

FOREIGN PATENT DOCUMENTS

| | | | |
|---|---|---|---|
| 131893 | 8/1983 | Japan | 361/119 |

*Primary Examiner*—A. D. Pellinen
*Assistant Examiner*—Derek S. Jennings
*Attorney, Agent, or Firm*—Wenderoth, Lind & Ponack

[57] ABSTRACT

A surge absorbing device of composite construction comprising a high resistance element of metal oxide and a pair of electrodes connected to the high resistance element with a discharging gap formed between the electrodes. At a normal state, a fine current flows through the high resistance element, but when a surge voltage is transiently applied across the high resistance element, a triggering discharge is produced across the electrodes by a voltage drop of the product of the resistance value of the high resistance element and the value of surge current whereby it is immediately transferred to a main discharge of large current to absorb the surge current at a high velocity. A heat-proof and reduction-proof protective film is formed on the surface of the high resistance element to stabilize the characteristic of surge absorption. The protective film may be formed of a carbide of a carbon group element, of lead borosilicate glass or deleaded glass, or of a multi-layer of lead borosilicate glass or deleaded glass ad metal oxide.

16 Claims, 11 Drawing Figures

(A)

(A)

(B)

SURGE ABSORBING DEVICE

This application is a continuation-in-part of Ser. No. 592,806 filed March 23, 1984 now abandoned.

BACKGROUND OF THE INVENTION

In order to protect electronic circuit elements from surge voltage or thunder shock applied thereto, it is conventional to use a surge absorbing device such as a varistor comprising a high resistance element of metal oxide having a nonlinear characteristic of voltage or an arrester comprising a discharge gap provided between a pair of electrodes. The varistor has a high response velocity of approximately $10^{-9}$ second relative to the surge, but is compelled to have a large size in order to increase its current-proof characteristic because otherwise it has a small current-proof characteristic and also tends to self-oscillate or distort a normal signal waveform due to its large electrostatic capacity of approximately 200–800 pF. The arrester has a large current-proof characteristic and a small electrostatic capacity of approximately 2–5 pF, but has a low response velocity of approximately $10^{-6}$ second, which disadvantageously prevents the electronic circuit from being protected from steep surge.

In order to avoid the drawbacks of the prior surge absorbing devices, the inventors have previously proposed a surge absorbing device having the advantages of the prior varistor and arrester as shown in FIG. 1 (see Japanese patent application No. 30357/1983). The proposed surge absorbing device 1 comprises a substrate of high resistance element 2 and a pair of electrodes 4 and 4' having outer leads 3 and 3', provided on the periphery of the high resistance element 2 and facing each other with a discharge gap 5 formed between the electrodes 4 and 4'. The components are contained in a hermetically sealed case 7 which is filled with gaseous medium 8 for discharge. The surge absorbing device serves to absorb a surge current at high velocity in the following manner. When a surge voltage is transiently applied across the high resistance element 2, an exciting discharge occurs between the electrodes 4 and 4' due to voltage drop of the product of the resistance value of the high resistance element 2 and the value of surge current and is immediately transferred into a main discharge of large current by its excitation.

The surge absorbing device advantageously has a higher response velocity, a smaller electrostatic capacity and a smaller size relative to the prior varistor and arrester, and in addition thereto has an improved current-proof characteristic. However, in case the high resistance element as the substrate comprises metal oxide having a nonlinear or linear characteristic of voltage, it has a varied limited voltage due to variation in the resistance value of the high resistance element or in a coeffecient of nonlinearity of voltage during its manufacture or usage, making the characteristic of surge absorption unstable. This results firstly from heating, in the process of manufacture, for removal of gas out of the components, which may be accomplished by a so-called vacuum baking and which is required to stabilize the characteristic of discharge between the electrodes. It also results, secondly, from exposure of the high resistance element to the atmosphere of discharge between the electrodes, which causes the metal oxide to be reduced due to high temperature and ionic shock.

SUMMARY OF THE INVENTION

Accordingly, it is a principal object of the invention to provide a surge absorbing device adapted to have a stable characteristic of surge absorption.

It is another object of the invention to provide a surge absorbing device adapted to prevent a high resistance element of metal oxide from being reduced, without damaging the surge absorption characteristic, to thereby prevent a limited voltage from being varied.

In accordance with the invention, there is provided a surge absorbing device comprising a high resistance element of metal oxide, a pair of electrodes provided on the periphery of said high resistance element facing each other with a discharge gap formed between said electrodes, and a hermetically sealed case in which said high resistance element and said electrodes are contained, characterized by further comprising a heat-proof and reduction-proof protective film formed on the surface of said high resistance element.

BRIEF DESCRIPTION OF THE DRAWINGS

The above and other objects and features of the invention will be apparent from the description of the embodiments taken with reference to the accompanying drawings in which:

FIGS. 9A and 9B illustrate characteristics of limited voltage in a vacuum-heating test when a high resistance element has a protective film provided thereon and when a high resistance element has no protective film provided thereon, respectively, FIG. 9A showing the characteristic in case of a limited voltage of 1.0 mA while FIG. 9B shows the characterisitc in case of a limited voltage of 0.1 mA.

DETAILED DESCRIPTION OF THE EMBODIMENTS

Figure 1:
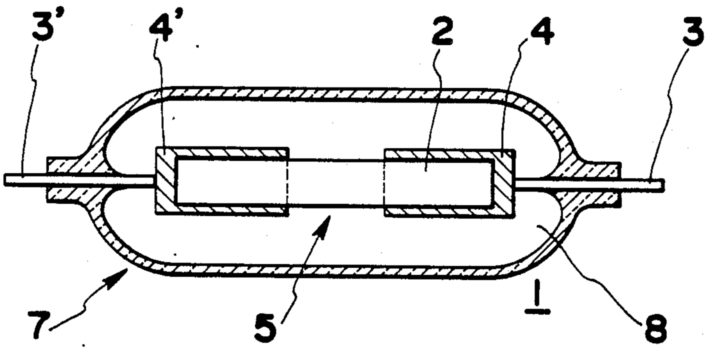
FIG. 1 (PRIOR ART)
Fig. 1 is a longitudinally sectional view of a prior surge absorbing device.
Figure 2:
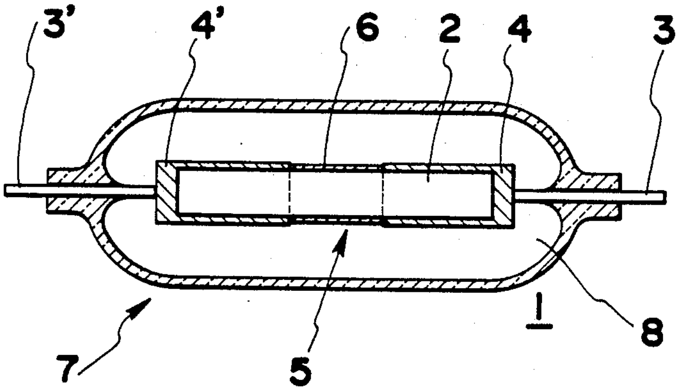
FIG. 2A is a longitudinally sectional view of a surge absorbing device constructed in accordance with one embodiment of the invention.
Fig. 2B is an enlarged sectional view of the main components used in the surge absorbing device of FIG. 2A.
Figure 2:
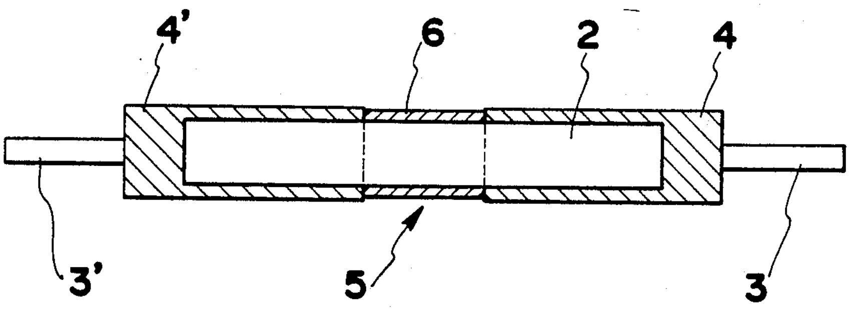

Referring now to FIG. 2, there is shown a surge absorbing device 1 constructed in one embodiment of the invention. The surge absorbing device 1 comprises a cylindrical high resistance element 2 of metal oxide having the characteristic of voltage non-linearity and a pair of electrodes 4 and 4' provided on both ends of the high resistance element 2 and having outer leads 3 and 3' extending therefrom, respectively. A discharge gap 5 is formed between the electrodes 4 and 4'. A heat-resisting and reduction-resisting protective film 6 of carbide is provided on the periphery of the high resistance element 2 that is not covered with the electrodes 4 and 4' so that the periphery of the high resistance element is partially exposed, i.e. protective film 6 is a discontinuos film. A hermetically sealed case 7 contains the high resistance element 2 together with the electrodes 4 and 4' so that the leads 3 and 3' are sealingly led out of the case 7. The hermitically sealed case 7 is filled with gaseous medium 8 for discharging. Alternatively, the case 7 may be substantially evacuated.

The protective film 6 may be formed by painting on the high resistance element 2, a paste of a carbide of a carbon group element such as silicon carbide (SiC) solved by a solvent and thereafter baking it at a temperature of approximately 800° C. which is sufficiently high for removing the solvent and lower than the crystallization temperature of SiC. It should be noted that the powder of SiC is neither crystallized nor melted onto the high resistance element and thus forms the protective film 6 of high resistance substance of substantial insulation having a partially discontinuous construction due to spot contact of the SiC powder. Since the thus formed protective film 6 never chemically reacts with the high resistance element 2 as observed in a conventional nonactive substance such as chrome oxide, silicate of soda, soda-lime glass or the like, the varistor characteristic which the high resistance element essentially has never varies.

Figure 3:
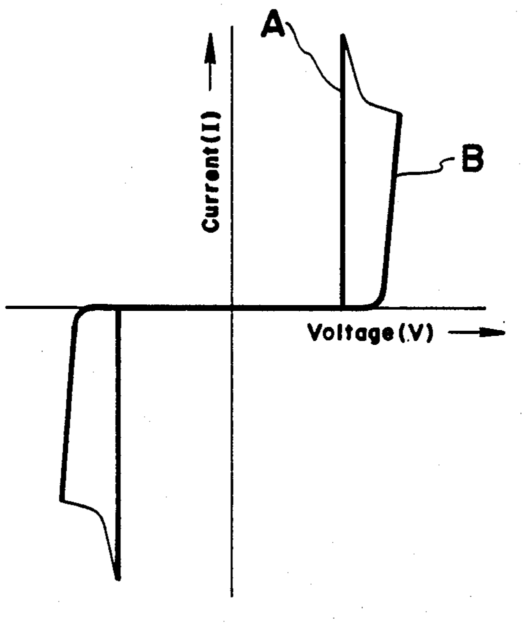
Fig. 3 illustrates a characteristic of voltage-current of the surge absorbing device of FIG. 2A.

FIG. 3 shows a waveform obtained by observing a characteristic of voltage to current by an oscillograph. As noted from FIG. 3, the surge may be absorbed initially in accordance with the varistor characteristic (B) of the high resistance element 2 when the surge is applied thereacross, but mainly in accordance with the arrester characteristic (A) which is caused by the discharge between the electrodes 4 and 4' when the surge energy becomes large. On the other hand, when the surge is applied, the resistance value of the protective film 6 of SiC decreases, which causes a current to concentrically flow through the surface of the high resistance element because of the skin effect peculiar to the application of high frequency. Thus, it will be noted that the transfer from the varistor characteristic to the arrester characteristic can be easily made.

Figure 4:
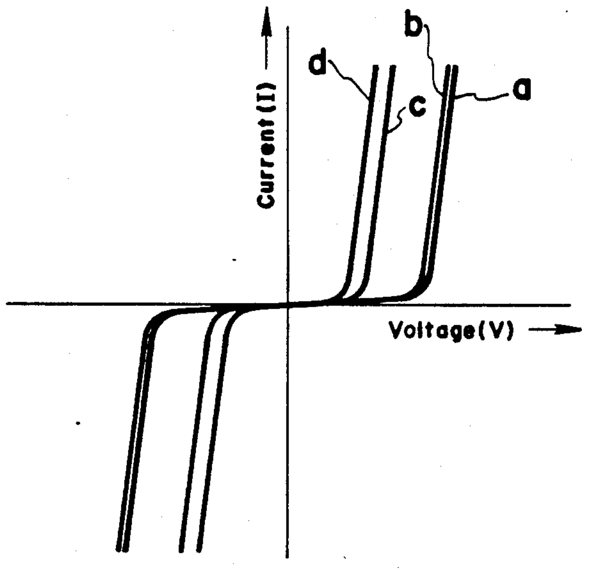
Fig. 4 illustrates characteristics of voltage-current of high resistance elements which are not covered and which are covered with a protective film, respectively.

FIG. 4 shows various characteristics of voltage to current of the high resistance element itself and those on which various protective films of different materials are formed. As noted from FIG. 4, the characteristic (b) of the high resistance element having the protective film of SiC formed thereon has no variation from the essential varistor characteristic (a) of the high resistance element itself as compared with the characteristic (d) of the high resistance element having the protective film of conventional nonactive materials such as chrome oxide or silicate of soda and the characteristic (c) of the high resistance element having the protective film of soda-lime glass.

Figure 5:
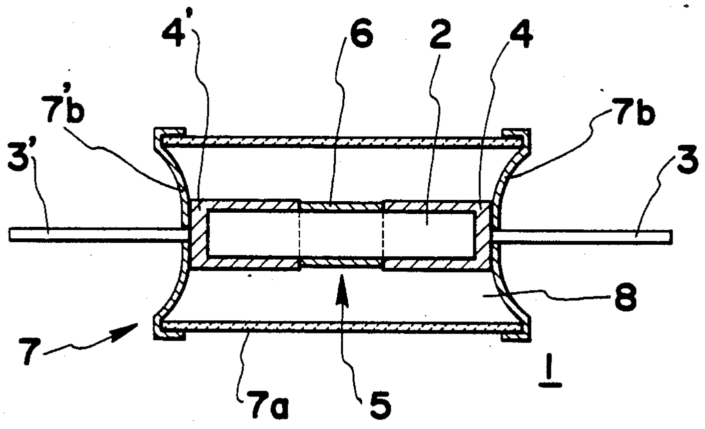
FIG. 5 is a longitudinally sectional view of a surge absorbing device constructed in accordance with another embodiment of the invention.

FIG. 5 illustrates the surge absorbing device 1 constructed in accordance with another embodiment of the invention. The surge absorbing device 1 of FIG. 5 is substantially identical to that of FIG. 2, except that the heat-proof and reduction-proof protective film 6 is formed of lead borosilicate glass and the hermetically sealed case 7 comprises a cylindrical body *7a* and two end caps *7b* and *7'b* sealingly engaged with the cylindrical body *7a*. The same numerals designate the same components.

The protective film 6 of FIG. 5 may be formed by coating or printing on the high resistance element 2, a paste of lead borosilicate glass solved by a solvent and thereafter baking it at a relatively lower temperature of 400° C. If the lead borosilicate glass has crystals, then the construction, of the crystals never varies after it is once crystallized so long as it is heated at a high temperature of 1000° C., which causes the protective film 6 to be extremely strengthed.

Figure 6:
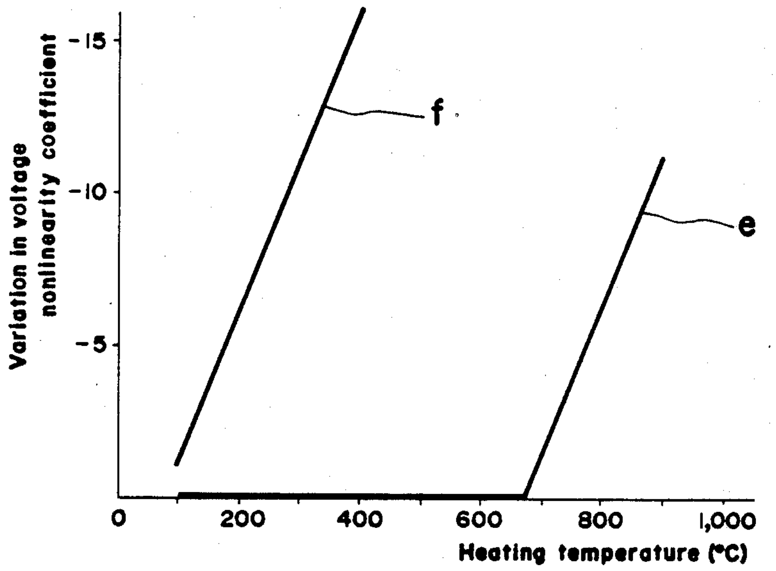
FIG. 6 illustrates variations in the coefficient of nonlinearity of voltage in a vacuum-heating test when a high resistance element used in the embodiment of FIG. 5 is not covered with a protective film and when it is covered with the film, respectively.

FIG. 6 shows variation in voltage nonlinearity coefficient when a vacuum heating test was made in the condition of $4\times10^{-5}$ Torr. and heating for 60 seconds. The line (e) shows variation when the protective film of lead borosilicate glass was formed while the line (f) shows variation when the protective film was not formed. As noted from FIG. 6, in case of the protective film of lead borosilicate film, the voltage nonlinearity coefficent had little variation even though it was heated to a temperature of 680° C.

Figure 7:
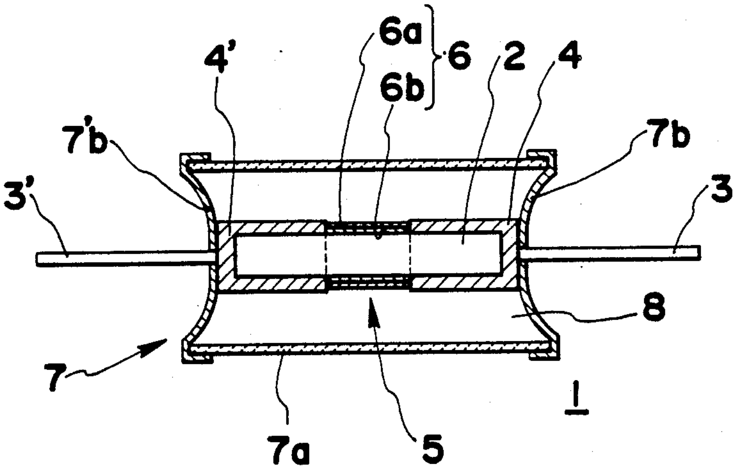
FIG. 7 is a longitudinally sectional view of a surge absorbing device constructed in accordance with a further embodiment of the invention.

FIG. 7 illustrates the surge absorbing device 1 constructed in accordance with another embodiment of the invention. The surge absorbing device of FIG. 7 is substantially identical to that of FIG. 5, except that the protective film 6 comprises a multi-layer of an outer layer portion *6a* of deleaded glass and an inner layer portion *6b* of metal oxide. The same numerals designate the same components.

The inner layer portion *6b* may be formed of single metal oxide such as magnesium oxide (MgO), silicon oxide ($Si0_2$), tin oxide ($Sn0_2$), aluminum oxide ($A1_2O_3$) or the like, or a composite thereof. The inner layer portion *6b* may be formed either by painting or coating on the high resistance element 2, a liquid or paste of metal oxide or oxides solved by a solvent and thereafter baking it, or by sputtering metal and thereafter oxidizing it. The outer layer portion *6a* may be formed of deleaded glass such as bismuth glass including bismuth oxide ($Bi_2O_3$) The outer layer portion *6a* may be formed by coating on the high resistance element 2, a paste of deleaded glass solved by a solvent and thereafter baking it. Each of the outer and inner layer portions *6a* and *6b* serves to protect the high resistance element from thermal or ionic shock, but the inner layer portion *6b* of metal oxide has a poor weather-proof characteristic because of its porosity while the outer layer portion *6a* has an excellent weather-proof characteristic, but chemically reacts with substances of the high resistance element 2. Thus, it will be noted that the multi-layer causes both drawbacks to be avoided. It should be noted that metal oxide of the inner layer portion *6b* preferably has a tendency not to chemically act with deleaded glass of the outer layer portion *6a*. If deleaded glass includes alkali components having high reactivity with substances of the high resistance element 2, even the outer layer portion *6a* adversely affects the characteristic of the high resistance element 2 due to the degree of porosity and/or thickness of the inner layer portion *6b*. Thus, it will be noted that deleaded glass of the outer layer portion *6a* is preferably used which has no alkali component. Since deleaded glass includes no lead, no lead appears due to discharge between the electrodes 4 and 4' on absorption of the surge. Thus, it will be noted that no short-circuit occurs due to lead.

Figure 8:
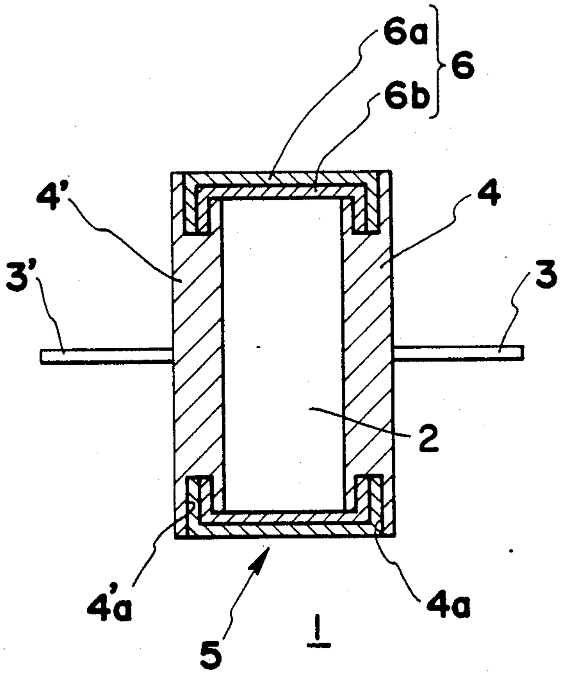
FIG. 8 is a longitudinally sectional view of main components of a surge absorbing device constructed in accordance with a further embodiment of the invention.

FIG. 8 illustrates the surge absorbing device 1 constructed in accordance with another embodiment of the invention. Although, in the embodiment of FIG. 8, the construction of the surge absorbing device is substantially identical to those of the aforementioned embodiments, the high resistance element 2 is in the form of a disk and the electrodes 4 and 4' are formed on the opposite faces of the high resistance element 2. The protective film 6 which comprises a multi-layer in the same manner as shown in FIG. 7 is provided on the exposed surfaces of the high resistance element 2. As shown in FIG. 8, the edges of the protective film 6 are inserted into grooves 4a and 4'a in the elctrodes 4 and 4'. In FIG. 8, the case is shown to be omitted.

Figure 9:
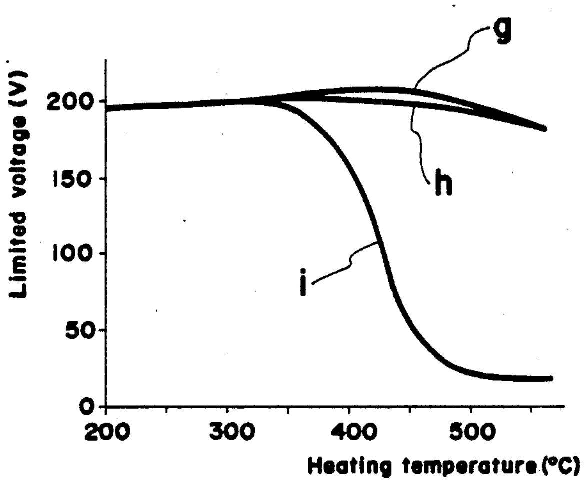
Figure 9:
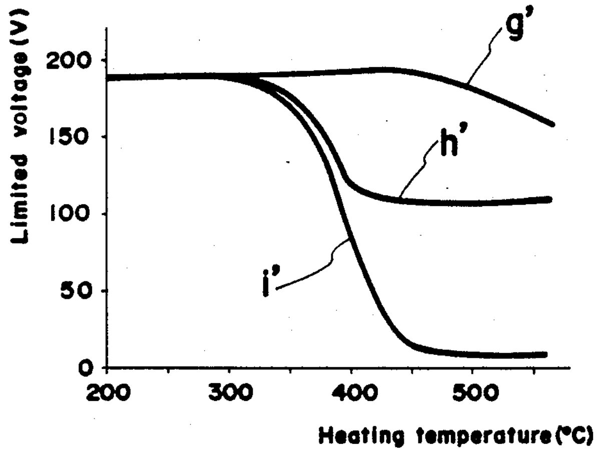

FIGS. 9A and 9B show limited voltage of the high resistance element relative to heating temperature in a vacuum-heating test in the condition of $1\times10^{-5}$ Torr. and heating for 7 minutes. The curves (g) and (g') are the results from the protective film having the outer layer portion of deleaded glass (bismuth glass) and the inner layer portion of metal oxide (MgO), the curves (h) and (h') those from the protective film of only metal oxide ($SiO_2$), and the curves (i) and (i') those from no protective film. FIG. 9A shows the results when the limited current is 1.0 mA while FIG. 9B shows the results when the limited current is 0.1 mA. It will be noted that the limited voltage has little variation in case of the multi-layer protective film.

Although the high resistance element 2 may be preferably formed of materials of voltage nonlinear characteristic such as ZnO, $TiO_2$, $Fe_2O_3$, and $SnO_2$, it should be noted that no limitation is made thereto. It may be formed of materials of voltage linear characteristic, the portion of the high resistance element which engages the electrodes may be formed of materials of voltage linear characteristic while the remaining portion may be formed of materials of voltage nonlinear characteristic. Also, although, in the illustrated embodiments, the device has a pair of electrodes, pairs of electrodes may be provided if necessary. Furthermore, the configuration of the high resistance element may be of a cross section other than a cylinder or disk. Gaseous medium 8 may be preferably a simple substance or composite of noble gases such as He, Ne or Ar, nitrogen ($N_2$) or carbon dioxide ($CO_2$), or it may be oxygen, oxygen compound or combination of oxygen or oxygen compound and the latter gas which may be $CO_2+N_2$, for example. In this case, metal oxide can be prevented from reduction.

Thus, it will be noted that since the high resistance element has the heat-proof and reduction-proof protective film provided thereon, metal oxide of the high resistance element is little reduced during the process of manufacture or usage. This causes limited voltage to have no variation whereby the surge absorption characteristic is stabilized together with a higher response velocity, a high current-proof characteristic and a small electrostatic capacity of the composite surge absorbing device.

Although some preferred embodiments of the invention have been illustrated and described with reference to the accompanying drawings, it will be understood by those skilled in the art that they are by way of examples, and that various changes and modifications may be made without departing from the spirit and scope of the invention, which is intended to be defined only by the appended claims.

What is claimed is:

1. A surge absorbing device comprising a high resistance element of metal oxide having a surface, a pair of electrodes provided on the surface of said high resistance element and facing each other with a discharge gap formed between said electrodes, a hermetically sealed case in which said high resistance element and said electrodes are contained, and a heat-proof and reduction-proof protective film formed on the surface of said high resistance element.

2. A surge absorbing device as set forth in claim 1, wherein said protective film is formed of a carbide of a carbon group element.

3. A surge absorbing device as set forth in claim 2, wherein said carbon group element is silicon.

4. A surge absorbing device as set forth in claim 2, wherein said protective film has a partially discontinuous construction.

5. A surge absorbing device as set forth in claim 1, wherein said protective film is formed of lead borosilicate glass.

6. A surge absorbing device as set forth in claim 5, wherein said lead borosilicate glass has a crystallized construction.

7. A surge absorbing device as set forth in claim 1 wherein said protective film comprises a multi-layer of an outer layer portion of deleaded glass and an inner layer portion of metal oxide chemically nonreactive with said outer layer portion.

8. A surge absorbing device as set forth in claim 7, wherein said outer layer portion of said protective film is formed of bismuth glass.

9. A surge absorbing device as set forth in claim 7, wherein said inner layer portion of said protective film is formed of at least one member selected from the group of magnesium oxide, silicon oxide, tin oxide and aluminum oxide.

10. A surge absorbing device as set forth in claim 1, wherein said high resistance element has a voltage nonlinear characteristic.

11. A surge absorbing device as set forth in claim 1, wherein said high resistance element has a voltage linear characteristic.

12. A surge absorbing device as set forth in claim 1, wherein said high resistance element has a portion of voltage nonlinear characteristic and another portion of voltage linear characteristic.

13. A surge absorbing device as set forth in claim 1, wherein said hermetically sealed case is filled with gaseous medium 14. A surge absorbing device as set forth in claim 13, wherein said gaseous medium is selected from the group of noble gas, nitrogen gas and carbon dioxide.

15. A surge absorbing device as set forth in claim 14, wherein said gaseous medium includes at least one of oxygen gas and an oxygen compound.

16. A surge absorbing device as set forth in claim 1, wherein said hermetically sealed case is substantially evacuated.

* * * * *